US012633632B2

(12) United States Patent
Xu et al.

(10) Patent No.: US 12,633,632 B2
(45) Date of Patent: May 19, 2026

(54) BATTERY

(71) Applicant: CALB Co., Ltd., Jiangsu (CN)

(72) Inventors: Jiuling Xu, Changzhou (CN); Yongjie Zhang, Luoyang (CN); Lulu Zhang, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 678 days.

(21) Appl. No.: 17/975,521

(22) Filed: Oct. 27, 2022

(65) Prior Publication Data

US 2023/0420814 A1     Dec. 28, 2023

(30) Foreign Application Priority Data

Jun. 28, 2022     (CN) .......................... 202210753738.X

(51) Int. Cl.
H01M 50/636     (2021.01)
H01M 50/103     (2021.01)
H01M 50/533     (2021.01)

(52) U.S. Cl.
CPC ....... H01M 50/636 (2021.01); H01M 50/103 (2021.01); H01M 50/533 (2021.01)

(58) Field of Classification Search
None
See application file for complete search history.

(56) References Cited

U.S. PATENT DOCUMENTS

2015/0079448 A1*   3/2015   Isozaki ............... H01M 50/505
                                                            429/178
2018/0102528 A1*   4/2018   Negishi ............... H01M 50/553

2018/0226620 A1*   8/2018   Matsumoto ......... H01M 50/557
2021/0036379 A1*   2/2021   Zhou .................... H01M 50/54
2022/0102818 A1*   3/2022   Rhee ................... H01M 50/176
2023/0395957 A1*   12/2023   Hong ................. H01M 50/682

FOREIGN PATENT DOCUMENTS

| CN | 203085674 | 7/2013 |
| CN | 104067401 | 9/2014 |
| CN | 211605201 | 9/2020 |
| CN | 215008377 | 12/2021 |
| CN | 114335829 | 4/2022 |

(Continued)

OTHER PUBLICATIONS

KR20110082966A machine translation (Year: 2026).*

(Continued)

*Primary Examiner* — Brian R Ohara
*Assistant Examiner* — M. T. Leonard
(74) *Attorney, Agent, or Firm* — JCIP GLOBAL INC.

(57)     ABSTRACT

A battery includes a battery casing and a cell. The battery casing is provided with a liquid injection hole, and the cell is disposed in the battery casing. The cell includes a cell body and a tab portion. The tab portion extends from a side surface of the cell body, the liquid injection hole is located on a side of the cell body adjacent to the tab portion, and the liquid injection hole is disposed on a surface of the battery casing opposite to a larger surface of the tab portion. In a direction perpendicular to an extending direction of the cell body and the tab portion, a minimum vertical distance between the liquid injection hole and the tab portion is a, and a width of the cell body is b, where $5 \leq b/a \leq 20$.

6 Claims, 3 Drawing Sheets

(56)                       References Cited

FOREIGN PATENT DOCUMENTS

| CN | 216354676 U | * | 4/2022 | .......... H01M 50/636 |
|----|-------------|---|--------|------------------------|
| CN | 114497876   |   | 5/2022 | |
| CN | 217589344   |   | 10/2022 | |
| KR | 20110082966 A | * | 7/2011 | .......... H01M 50/317 |

OTHER PUBLICATIONS

"Search Report of Europe Counterpart Application", issued on Aug. 16, 2023, p. 1-p. 8.
"Examination Report of India Counterpart Application", issued on Mar. 6, 2026, p. 1-p. 8.

* cited by examiner

BATTERY

CROSS-REFERENCE TO RELATED APPLICATION

This application claims the priority benefit of China application no. 202210753738.X, filed on Jun. 28, 2022. The entirety of the above-mentioned patent application is hereby incorporated by reference herein and made a part of this specification.

BACKGROUND

Technical Field

The disclosure relates to the technical field of batteries, and in particular, relates to a battery.

Description of Related Art

In the related art, liquid injection into the battery may be implemented by arranging liquid injection holes on the battery casing. The relationship between the arrangement positions of the liquid injection holes and the tab portions of the cell directly affects the overall liquid injection effect and the safety performance of the battery.

SUMMARY

The disclosure provides a battery.

The disclosure provides a battery. The battery includes a battery casing and a cell. The battery casing is provided with a liquid injection hole. The cell is disposed in the battery casing and includes a cell body and a tab portion. The tab portion extends from a side surface of the cell body, the liquid injection hole is located on a side of the cell body adjacent to the tab portion, and the liquid injection hole is disposed on a surface of the battery casing opposite to a larger surface of the tab portion. In a direction perpendicular to an extending direction of the cell body and the tab portion, a minimum vertical distance between the liquid injection hole and the tab portion is a, and a width of the cell body is b, where $5 \leq b/a \leq 20$.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

Figure 1:
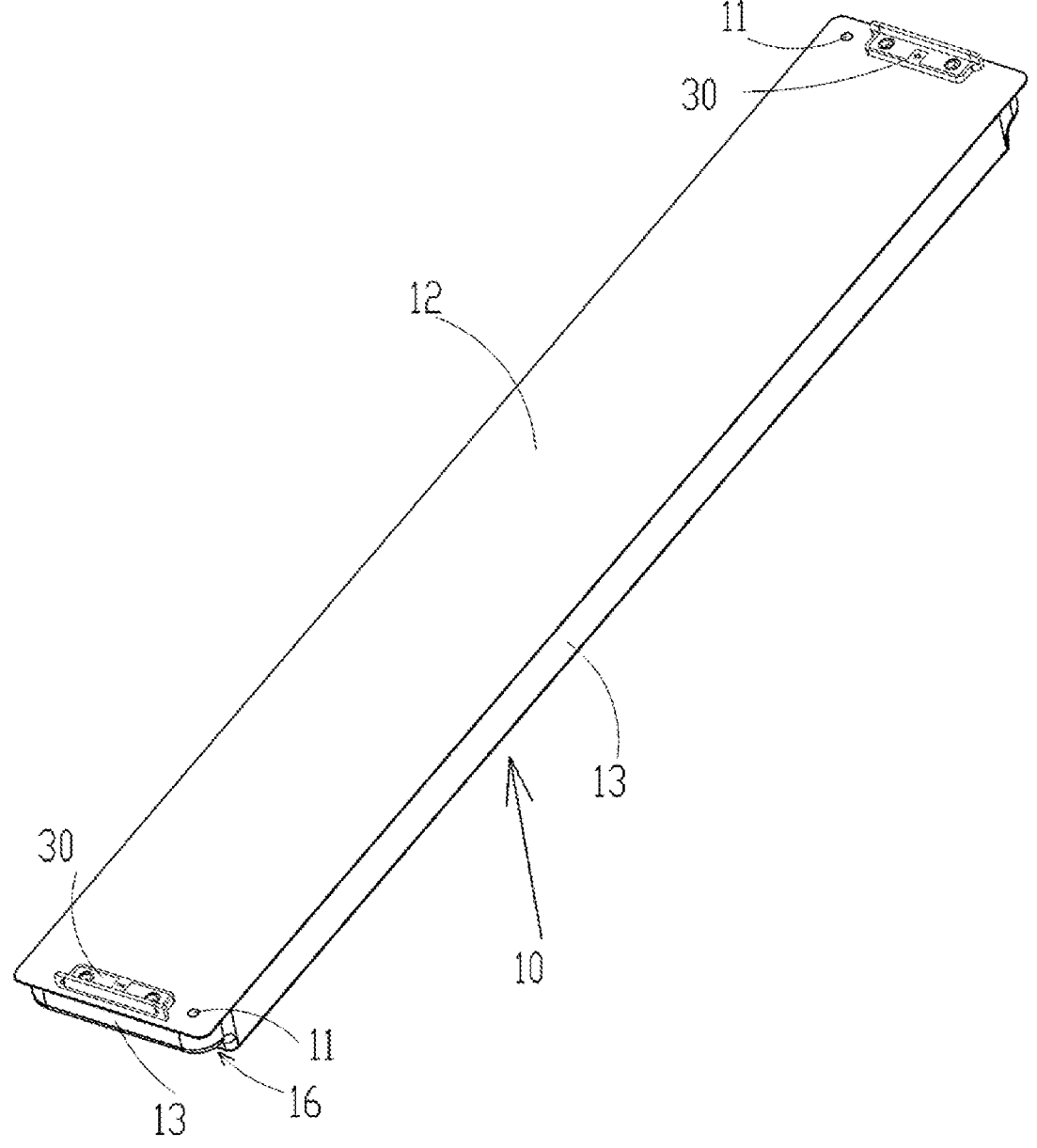
FIG. 1 is a schematic view illustrating a battery according to an exemplary embodiment.
Figure 2:
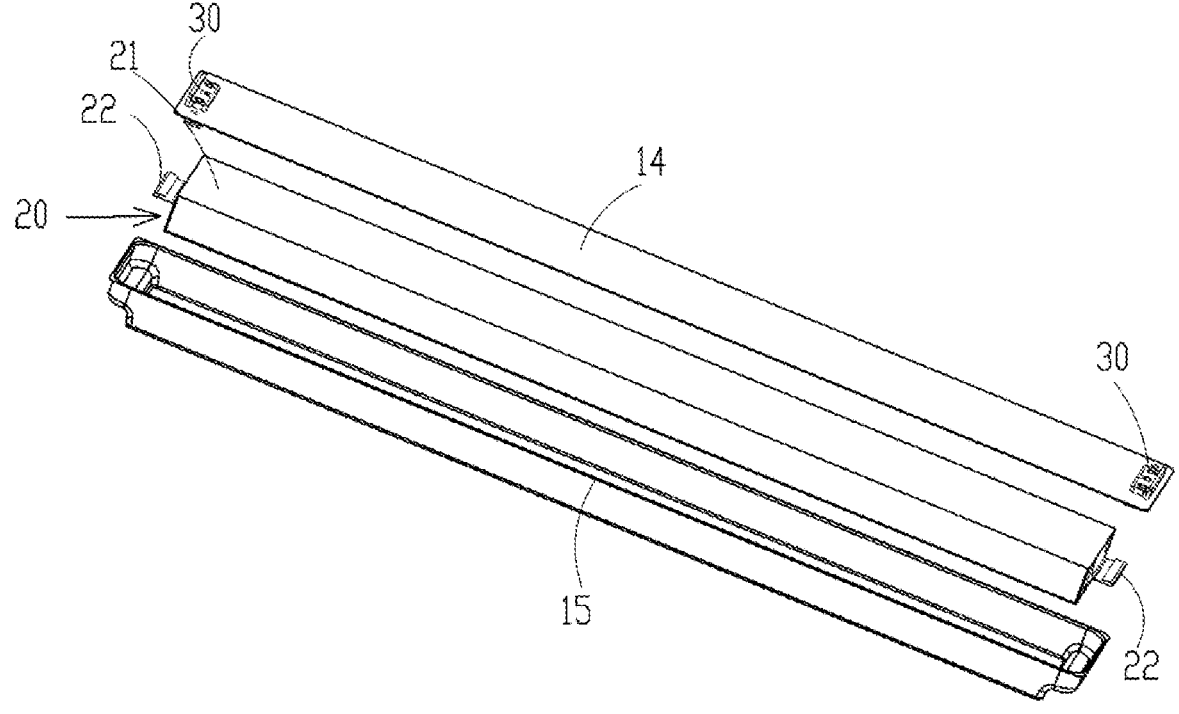
FIG. 2 is a schematic exploded view illustrating the battery according to an exemplary embodiment.
Figure 3:
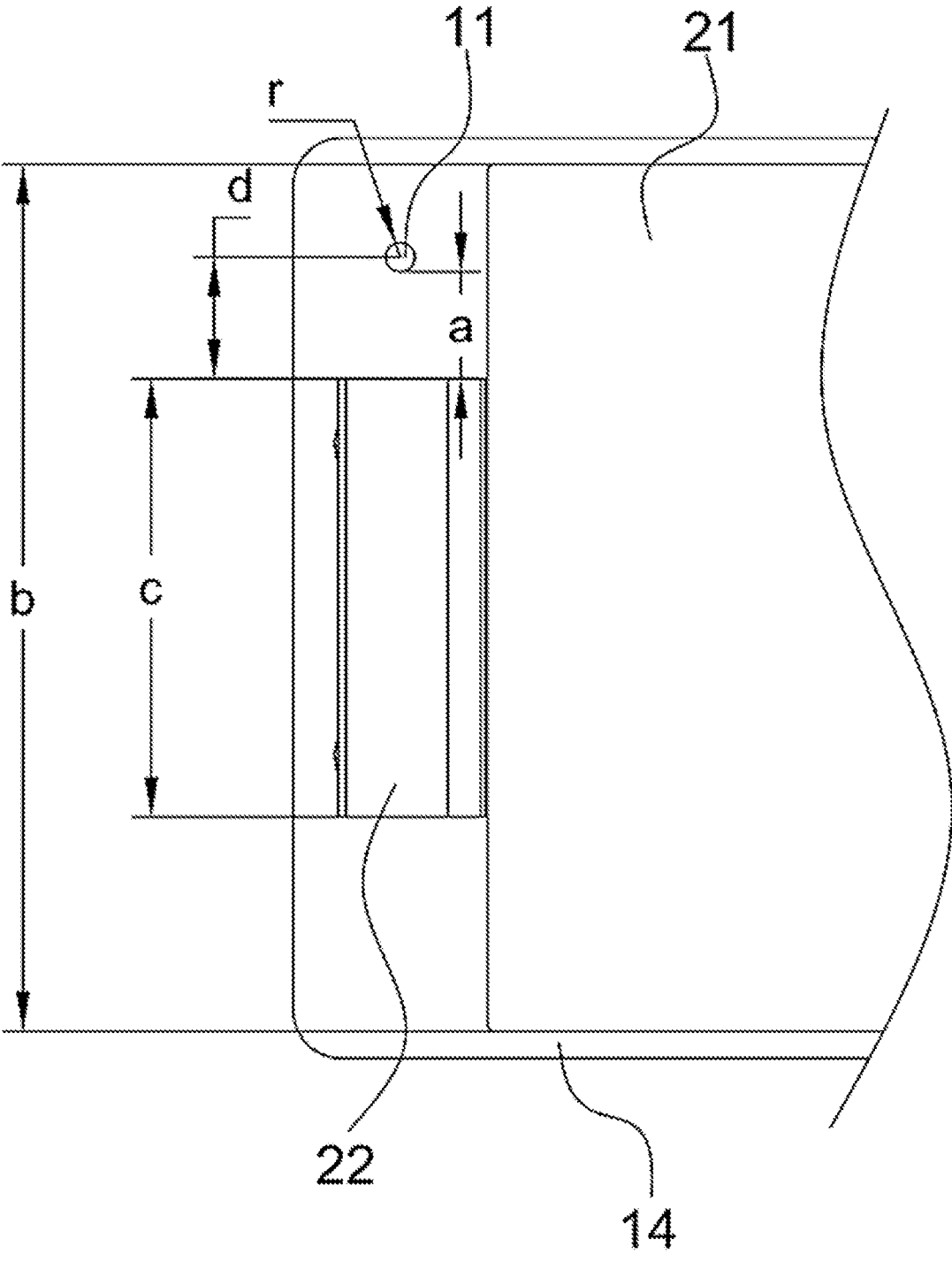
FIG. 3 is a partially enlarged view illustrating the battery according to an exemplary embodiment.

An embodiment of the disclosure provides a battery. With reference to FIG. 1 to FIG. 3, the battery includes a battery casing 10 provided with liquid injection holes 11 and a cell 20 disposed in the battery casing 10. The cell 20 includes a cell body 21 and tab portions 22. The tab portions 22 respectively extend from side surfaces of the cell body 21, the liquid injection holes 11 are respectively located on sides of the cell body 21 adjacent to the tab portions 22, and the liquid injection holes 11 are disposed on a surface of the battery casing 10 opposite to larger surfaces of the tab portions 22. Herein, in a direction perpendicular to an extending direction of the cell body 21 and the tab portions 22, a minimum vertical distance between each liquid injection hole 11 and the corresponding tab portion 22 is a, and a width of the cell body 21 is b, where the equation of $5 \leq b/a \leq 20$ is satisfied.

In an embodiment of the disclosure, the battery includes the battery casing 10 and the cell 20, and the battery casing 10 is provided with the liquid injection holes 11. The tab portions 22 of the cell 20 respectively extend from the side surfaces of the cell body 21 of the cell 20, the liquid injection holes 11 are respectively located on the sides of the cell body 21 adjacent to the tab portions 22, and the liquid injection holes 11 are disposed on the surface of the battery casing 10 opposite to the larger surfaces of the tab portions 22. In this way, the liquid injection holes 11 may be conveniently used for liquid injection into the battery casing 10. In a width direction of the cell body 21, the minimum vertical distance between each liquid injection hole 11 and the corresponding tab portion 22 is a, and the width of the cell body 21 is b, where $5 \leq b/a \leq 20$ is satisfied. In this way, the impact on the tab portions 22 during the electrolyte injection process may be avoided, and the width of each tab portion 22 may be ensured, such that the overcurrent capability of the cell 20 and the charging and discharging rates of the battery may be ensured, and the use performance of the battery is thereby improved.

It is noted that the tab portions 22 respectively extend from the side surfaces of the cell body 21, and each of the liquid injection holes 11 is located on the side of the cell body 21 adjacent to the corresponding tab portion 22. That is, the corresponding tab portion 22 and the liquid injection hole 11 are located on the same side of the cell body 21. Therefore, when the electrolyte is injected through the liquid injection holes 11, the distance between the tab portion 22 and the corresponding liquid injection hole 11 need to be controlled to ensure that the electrolyte may be reliably injected without affecting other structures.

In the process of injecting the electrolyte into the battery casing 10, the direct impact of the electrolyte on the tab portions 22 is required to be avoided. If the value of b/a is excessively large, it means that the distance between the tab portion 22 and the corresponding liquid injection hole 11 is relatively short, which causes the electrolyte to be easily sprayed onto the tab portion 22 during the liquid injection process of the battery. As such, the infiltration rate of the electrolyte may be affected, and the tab portions 22 may be washed out, resulting in structural damage.

If the value of b/a is excessively small, it means that the distance between the tab portion 22 and the liquid injection hole 11 are relatively long. In this case, the size of each tab portion 22 is small, and the overcurrent capability of the cell and the charging and discharging rates of the battery are thus affected. Further, the tab portions 22 generate considerable heat, and the safe use of the battery is thereby affected. Alternatively, if the distance between the tab portion 22 and the liquid injection hole 11 is larger, the liquid injection hole 11 may be excessively adjacent to the end portion of the battery casing 10, and the diffusion of the electrolyte around the battery may thus be affected.

The liquid injection holes 11 are used to realize liquid injection into the interior of the battery casing 10, and sealing may be carried out through the sealing structure after the liquid injection is completed. At least two liquid injection holes 11 may be provided, and the at least two liquid injection holes 11 may be centrally symmetric with respect to the intersection of a first diagonal direction and a second diagonal direction of the battery casing 10.

It is noted that the cell body 21 includes two or more electrode pieces, each tab portion 22 includes two or more single-piece tabs, and the single-piece tabs respectively extend from the corresponding electrode pieces. The width of each single-piece tab may be less than the width of each electrode piece. Multiple single-piece tabs are stacked to form each tab portion 22 and are connected to the electrode lead-out structures, for instance, each tab portions 22 may be electrically connected to a terminal component. The single-piece tabs are made of metal foils with great electrical and thermal conductivity, such as aluminum, copper, or nickel. The width direction of the cell body 21 may be regarded as the width direction of a single electrode piece, and the direction perpendicular to the extending direction of the cell body 21 and the tab portions 22 is the width direction of the single electrode piece. The width direction of the tab portions 22 is parallel to the direction perpendicular to the extending direction of the cell body 21 and the tab portions 22.

With reference to FIG. 3, in the direction perpendicular to the extending direction of the cell body 21 and the tab portion 22, that is, in the width direction of the cell body 21, the minimum vertical distance between the liquid injection hole 11 and the tab portion 22 is a, and the width of the cell body 21 is b, where $5 \leq b/a \leq 20$ is satisfied. The ratio between the width b of the cell body 21 and the minimum vertical distance a between the liquid injection hole 11 and the tab portion 22 may be 5, 5.5, 6, 6.5, 7, 7.5, 8, 9, 10, 11, 12, 13, 14, 15, 16, 16.5, 17, 17.5, 18, 18.5, 19, 19.5, 19.8, 19.9, or 20 and so on.

In an embodiment, with reference to FIG. 3, in the width direction of the cell body 21, a width of each tab portion is c, where $1.5 \leq b/(c+a) \leq 3$ is satisfied. In this way, it can be ensured that the tab portion 22 has a relatively large width, and a specific distance is provided between the tab portion 22 and the liquid injection hole 11. In this way, the impact on the tab portions 22 during the electrolyte injection process may be avoided, the overcurrent capability of the cell 20 and the charging and discharging rates of the battery may be ensured, and the use performance of the battery is thereby improved. $b/(c+a)$ may be 1.5, 1.6, 1.7, 2, 2.5, 2.8, 2.9, or 3 and so on.

It is noted that in the width direction of the cell body 21, when the minimum vertical distance between the liquid injection hole 11 and the tab portion 22 is a, the width of the cell body 21 is b, and the width of the tab portion 22 is c, if $5 \leq b/a \leq 20$ and $1.5 \leq b/(c+a) \leq 3$ are satisfied, the distance between the tab portion 22 and the liquid injection hole 11 is reasonable, and the size of the tab portion 22 may be ensured to be reasonable. Further, the liquid injection hole 11 may not be excessively adjacent to the end portion of the battery casing 10, so that rapid infiltration of the electrolyte may be satisfied, and the tab portion 22 may be prevented from being damaged by the electrolyte.

In an embodiment, with reference to FIG. 3, the liquid injection hole 11 includes a circular hole, and an orthographic projection of the tab portion 22 on the surface of the battery casing 10 provided with the liquid injection hole is spaced apart from the circular hole. Herein, a radius of the circular hole is r, and a minimum vertical distance between the center of the circular hole and the tab portion 22 is d, where $a=d-r$. By designing the liquid injection hole 11 as a circular hole, the liquid injection hole 11 may be easily formed, and the electrolyte may be easily injected. Further, the distance between the liquid injection hole 11 and the tab portion 22 may also be easily controlled. so even if the electrolyte may impact the tab portion 22, it can be avoided that the electrolyte may impact the tab portion 22 in a large amount.

In an embodiment, the width of the tab portion 22 is c, where $20 \text{ mm} \leq c \leq 60 \text{ mm}$ is satisfied, and in this way, the overall overcurrent capability of the cell 20 is ensured, and spaces are reserved for other structures in the battery, so that other structures may be easily configured, for example, the liquid injection holes 11 may be easily configured.

The width c of each of the tab portion 22 may be 20 mm, 21 mm, 25 mm, 30 mm, 35 mm, 40 mm, 45 mm, 50 mm, 55 mm, 57 mm, 58 mm, 59 mm, or 60 mm and so on.

In an embodiment, the radius of the circular hole of the liquid injection hole 11 is r, where $1.2 \text{ mm} \leq r \leq 2.5 \text{ mm}$ is satisfied. In this way, it can be ensured that the electrolyte may be quickly injected through the liquid injection hole 11, and the size of the liquid injection hole 11 may be prevented from being excessively large to affect the structural strength of the battery casing 10 and to take up too much space, so that spaces are reserved for the arrangement of other structures.

The circular hole radius r of the liquid injection hole 11 may be 1.2 mm, 1.3 mm, 1.4 mm, 1.5 mm, 1.8 mm, 2 mm, 2.2 mm, 2.4 mm, or 2.5 mm and so on.

In an embodiment, the width of the cell body 21 is b, where 70 mm≤b≤120 mm is satisfied. It is thus ensured that the battery has sufficient capacity, and further, the thickness of the cell body 21 is prevented from being excessively thick, so the cell 20 may be conveniently prepared.

The width b of the cell body 21 may be 70 mm, 71 mm, 72 mm, 75 mm, 80 mm, 85 mm, 90 mm, 95 mm, 98 mm, 100 mm, 105 mm, 110 mm, 112 mm, 115 mm, 118 mm, 119 mm, or 120 mm and so on.

In an embodiment, the distance between the end portion of each tab portion 22 away from the cell body 21 and the cell body 21 is greater than the maximum vertical distance between each liquid injection hole 11 and the cell body 21. That is, the maximum vertical distance between the orthographic projection of the tab portion 22 on the surface of the battery casing 10 provided with the liquid injection hole 11 and the cell body 21 is greater than the maximum vertical distance between the liquid injection hole 11 and the cell body 21. Compared to the liquid injection hole 11, the tab portion 22 may be closer to the end portion of the battery casing 10, such that it is ensured that the liquid injection hole 11 is prevented from being excessively adjacent to the end portion of the battery casing 10 to lower the structural strength of the battery casing 10. Further, it can also be ensured that the electrolyte solution may quickly infiltrate after being injected into the battery casing 10.

With reference to FIG. 3, the maximum vertical distance between the orthographic projection of the tab portion 22 on the surface of the battery casing 10 provided with the liquid injection hole 11 and the cell body 21 is greater than the maximum vertical distance between the liquid injection hole 11 and the cell body 21. Therefore, it can be considered that a first distance between the left end of the tab portion 22 and the left end of the first casing piece 14 is less than a second distance between the left end of the liquid injection hole 11 and the left end of the first casing piece 14.

In an embodiment, in a length direction of the cell body 21, the minimum vertical distance between each liquid injection hole 11 and the cell body 21 is less than the minimum vertical distance between the liquid injection hole 11 and a peripheral outer edge of the battery casing 10. That is, the distance between the liquid injection hole 11 and the peripheral outer edge of the battery casing 10 is greater than the distance between the liquid injection hole 11 and the cell body 21, so it is ensured that the liquid injection hole 11 is prevented from being excessively adjacent to the end portion of the battery casing 10 to lower the structural strength of the battery casing 10. Further, it can also be ensured that the electrolyte solution may quickly infiltrate after being injected into the battery casing 10.

With reference to FIG. 3, the minimum vertical distance between the liquid injection hole 11 and the cell body 21 is less than the minimum vertical distance between the liquid injection hole 11 and the peripheral outer edge of the battery casing 10. It can then be considered that the distance between the left end of the liquid injection hole 11 and the left end of the first casing piece 14 is greater than the distance between the right end of the liquid injection hole 11 and the left end of the cell body 21.

In an embodiment, as shown in FIG. 1, the battery casing 10 includes two opposite first surfaces 12 and four second surfaces 13 surrounding the first surfaces 12, and the area of each first surface 12 is greater than the area of each second surface 13. Herein, the liquid injection holes 11 are disposed on one of the first surfaces 12, so that the first surfaces 12 may provide reliable support surfaces for the liquid injection holes 11, facilitating the arrangement of the liquid injection holes 11 and liquid injection.

It should be noted that the two opposite first surfaces 12 are larger surfaces of the battery casing 10, and the four second surfaces 13 are smaller surfaces of the battery casing 10. The four second surfaces 13 include two pairs of smaller surfaces, namely, a first pair of smaller surfaces extending in the length direction of the battery casing 10 and a second pair of smaller surfaces extending in the width direction of the battery casing 10. The area of the first pair of smaller surfaces is greater than the area of the second pair of smaller surfaces, but both are smaller than the areas of the larger surfaces.

In an embodiment, as shown in FIG. 1 and FIG. 2, the battery casing 10 includes a first casing piece 14 and a second casing piece 15 connected to the first casing piece 14 to seal the cell 20. Herein, the first casing piece 14 is a flat plate, and the liquid injection holes 11 are provided on the first casing piece 14. In this way, the liquid injection holes 11 may be conveniently arranged, and the first casing piece 14 may exhibit a simple structure, thereby improving the molding efficiency of the battery.

In an embodiment, the material of the battery casing 10 may be stainless steel or aluminum featuring good corrosion resistance and sufficient strength. The battery casing 10 has a substantially rectangular shape.

It should be noted that, the first casing piece 14 and the second casing piece 15 may be independently arranged, as shown in FIG. 2. In some embodiments, it is not excluded that the first casing piece 14 and the second casing piece 15 may be an integral structure, and the space for accommodating the cell 20 is formed by stamping, and then welding is used for subsequent sealing and connection.

In an embodiment, as shown in FIG. 1 and FIG. 2, the battery further includes terminal components 30 disposed on the battery casing 10, and the terminal components 30 are respectively connected to the tab portions 22 of the cell 20. Each of the terminal components 30 and the corresponding liquid injection hole 11 are disposed in the width direction of the battery casing 10, and in this way, the terminal component 30 and the bus bar may be conveniently connected in the subsequent process, and the space of the battery casing 10 may be fully utilized. Therefore, it is ensured that structures such as the cell 20 may be reasonably arranged inside the battery casing 10, and the space of the battery casing 10 may be well utilized.

In some embodiments, two terminal components 30 are provided, and the two terminal components 30 are respectively a positive terminal component and a negative terminal component. Each terminal component 30 may include two terminals for enhancing the overcurrent capability of the battery. There are also two tab portions 22, and the two tab portions 22 are a positive tab and a negative tab, respectively. The positive terminal component is connected to the positive tab, and the negative terminal component is connected to the negative tab.

It should be noted that each terminal component 30 and the battery casing 10 may be insulated from each other, for instance, an insulating piece may be used for insulation between each terminal component 30 and the battery casing 10, or an insulating coating may be applied for insulation, which is not particularly limited herein, and selection may be made according to actual needs. In some embodiments, it is not excluded that one terminal component 30 may be electrically connected to the battery casing 10.

In an embodiment, the battery casing 10 is provided with recesses 16, and the terminal components 30 are respectively located in the recesses 16, so that the terminal components 30 may be prevented from occupying the stacking space of a battery apparatus, thereby improving the energy density of the battery apparatus.

In an embodiment, as shown in FIG. 1 and FIG. 2, the battery casing 10 is provided with the recesses 16, the terminal components 30 and the recesses 16 are respectively located on two opposite surfaces of the battery casing 10, and the recesses 16 are configured to accommodate terminal components of another battery. In this way, when the batteries are grouped, the terminal components of another battery may be respectively accommodated in the recesses 16, so the terminal components are prevented from occupying the space between the two batteries, the distance between the two adjacent batteries is reduced, and the energy density of the battery apparatus is thereby improved.

In an embodiment, as shown in FIG. 1 and FIG. 2, two terminal components 30 and two recesses 16 may be provided. The two terminal components 30 may be disposed on one of the first surfaces 12, and the two recesses 16 may be disposed on the other one of the first surfaces 12.

In an embodiment, the battery has a length L, where 400 mm≤L≤2500 mm is satisfied, and the battery has a width K and a height G, where 2K≤L≤50K and/or 0.5G≤K≤20G are satisfied.

Further, it may be 50 mm≤K≤200 mm and 10 mm≤G≤100 mm are satisfied.

It is preferable that 4K≤L≤25K and/or 2G≤K≤10G are satisfied.

Regarding the battery provided in the foregoing embodiments, in the case where sufficient energy density is ensured, the ratio of the length to the width of the battery is larger, and further, the ratio of the width to the height of the battery is larger.

In an embodiment, the length of the battery is L, and the width of the battery is K, where 4K≤L≤7K is satisfied. That is, the ratio of the length to the width of the battery in this embodiment is larger, and in this way, the energy density of the battery is increased, and subsequent formation of the battery apparatus may be conveniently performed.

In an embodiment, the height of the battery is G, where 3G≤K≤7G is satisfied. The ratio of the width to the height of the battery is larger, and in this way, under the condition that sufficient energy density is ensured, formation may be conveniently performed.

Optionally, the length of the battery may be 500 mm to 1500 mm, the width of the battery may be 80 mm to 150 mm, and the height of the battery may be 15 mm to 35 mm.

It should be noted that the length of the battery is the dimension in the length direction of the battery, the width of the battery is the dimension in the width direction of the battery, and the height of the battery is the dimension in the height direction of the battery, that is, the thickness of the battery.

In an embodiment, the battery is a laminated battery, which may be conveniently assembled and may further be processed to obtain a battery with a longer length.

The battery includes a cell and an electrolyte, and the battery is the smallest unit capable of performing electrochemical reactions such as charging/discharging. The cell refers to a unit formed by winding or laminating a stacked part, and the stacked part includes a first electrode, a separator, and a second electrode. When the first electrode is a positive electrode, the second electrode is a negative electrode. The polarities of the first electrode and the second electrode may be interchanged.

To be specific, the cell 20 is a laminated cell. The cell 20 has first electrode pieces that are stacked on each other, second electrode pieces having electrical property that is opposite to the first electrode pieces, and diaphragm pieces disposed between the first electrode pieces and the second electrode pieces. Therefore, multiple pairs of the first electrode pieces and the second electrode pieces are stacked to form the laminated cell.

Optionally, the battery may be a roll core. That is, the first electrode pieces, the second electrode pieces whose electrical properties are opposite to the first electrode pieces, and the diaphragm pieces disposed between the first electrode pieces and the second electrode pieces are wound to obtain a roll core.

An embodiment of the disclosure further provides a battery apparatus, and the battery apparatus includes the abovementioned battery.

In an embodiment of the disclosure, the battery of the battery apparatus includes the battery casing 10 and the cell 20, and the battery casing 10 is provided with the liquid injection holes 11. The tab portions 22 of the cell 20 respectively extend from the side surfaces of the cell body 21 of the cell 20, each of the liquid injection holes 11 is located on the side of the cell body 21 adjacent to the corresponding tab portion 22, and the liquid injection holes 11 are disposed on the surface of the battery casing 10 opposite to the larger surfaces of the tab portions 22. In this way, the liquid injection holes 11 may be conveniently used for liquid injection into the battery casing 10. In the width direction of the cell body 21, the minimum vertical distance between each liquid injection hole 11 and each tab portion 22 is a, and the width of the cell body 21 is b, where 5≤b/a≤20 is satisfied. In this way, the impact on the tab portions 22 during the electrolyte injection process may be avoided, and the width of each tab portion 22 may be ensured, such that the overcurrent capability of the cell 20 and the charging and discharging rates of the battery may be ensured, and the use performance of the battery apparatus is thereby improved.

In an embodiment, the battery apparatus is a battery module or a battery pack.

The battery module includes a plurality of batteries, and the battery module may further include end plates and side plates. The end plates and the side plates are configured to secure the batteries.

It is noted that a plurality of batteries may be formed into a battery module and then arranged in the battery box, and the plurality of batteries may be secured by the end plates and the side plates. The plurality of batteries may be directly disposed in the battery box, that is, the plurality of batteries are not required to be arranged into groups, and the end plates and the side plates may be removed at this time.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery, comprising:

a battery casing, provided with a liquid injection hole, wherein the battery casing comprises two opposite and largest first surfaces and four second surfaces surrounding the first surfaces, an area of each first surface is greater than an area of each second surface, and one of the first surfaces is provided with a recess;

a cell, disposed in the battery casing and including a cell body and a tab portion, the tab portion extends from a side surface of the cell body, the liquid injection hole is located on a side of the cell body adjacent to the tab portion, and the liquid injection hole is disposed on the other one of the first surfaces of the battery casing opposite to a largest surface of the tab portion; and a terminal component, disposed on the other one of the first surfaces of the battery casing and electrically connected to the tab portion, wherein the terminal component and the recess are respectively located on the two opposite first surfaces of the battery casing, and the recess is configured to accommodate a terminal component of another battery, wherein in a direction perpendicular to an extending direction of the cell body and the tab portion, a minimum vertical distance between the liquid injection hole and the tab portion is a, and a width of the cell body is b, where $5 \leq b/a \leq 20$, in a width direction of the cell body, a width of the tab portion is c, where $1.5 \leq b/(c+a) \leq 3$, the liquid injection hole comprises a circular hole, and a minimum vertical distance between a center of the circular hole and the tab portion is d, c is larger than a, and c is larger than d, where $20$ $mm \leq c \leq 60$ mm, an orthographic projection of the tab portion on the other one of the first surfaces of the battery casing provided with the liquid injection hole is spaced apart from the circular hole, and a radius of the circular hole is r, where $a = d - r$.

2. The battery according to claim 1, wherein $1.2$ $mm \leq r \leq 2.5$ mm.

3. The battery according to claim 1, wherein $70$ $mm \leq b \leq 120$ mm.

4. The battery according to claim 1, wherein the battery casing comprises:

a first casing piece; and a second casing piece, connected to the first casing piece to seal the cell, wherein the first casing piece is a flat plate, and the liquid injection hole is arranged on the first casing piece.

5. The battery according to claim 1, wherein a distance between an end portion of the tab portion away from the cell body and the cell body is greater than a maximum vertical distance between the liquid injection hole and the cell body.

6. The battery according to claim 5, wherein in a length direction of the cell body, a minimum vertical distance between the liquid injection hole and the cell body is less than a minimum vertical distance between the liquid injection hole and a peripheral outer edge of the battery casing.

* * * * *